United States Patent
Teragaki

(10) Patent No.: US 8,540,478 B2
(45) Date of Patent: Sep. 24, 2013

(54) MULTISTAGE HIGH-PRESSURE PUMP

(75) Inventor: Akio Teragaki, Tokyo (JP)

(73) Assignee: Ebara Corporation, Tokyo (JP)

( * ) Notice: Subject to any disclaimer, the term of this patent is extended or adjusted under 35 U.S.C. 154(b) by 975 days.

(21) Appl. No.: 12/523,773

(22) PCT Filed: Jan. 21, 2008

(86) PCT No.: PCT/JP2008/051133
§ 371 (c)(1),
(2), (4) Date: Jul. 20, 2009

(87) PCT Pub. No.: WO2008/090994
PCT Pub. Date: Jul. 31, 2008

(65) Prior Publication Data
US 2010/0080686 A1    Apr. 1, 2010

(30) Foreign Application Priority Data
Jan. 22, 2007   (JP) ................. 2007-011315

(51) Int. Cl.
  *F04D 29/10* (2006.01)
  *F01D 11/00* (2006.01)
(52) U.S. Cl.
  USPC ............... 415/112; 415/230; 277/369
(58) Field of Classification Search
  USPC ............... 415/111, 112, 113, 229, 230, 231; 277/369, 408, 431
  See application file for complete search history.

(56) References Cited

U.S. PATENT DOCUMENTS

| 3,560,063 A |   | 2/1971  | McClusky et al. |
|-------------|---|---------|-----------------|
| 3,861,825 A | * | 1/1975  | Blom ............... 415/199.3 |
| 3,994,503 A | * | 11/1976 | Dousse et al. ........... 277/347 |
| 5,344,313 A |   | 9/1994  | Johnsen, Jr. |
| 5,769,427 A | * | 6/1998  | Ostrowski ............. 277/318 |

(Continued)

FOREIGN PATENT DOCUMENTS

| JP | 49-34210 B1 | 9/1974 |
| JP | 61-9674 U | 1/1986 |

(Continued)

OTHER PUBLICATIONS

International Search Report of PCT/JP2008/051133, Mailing Date of Apr. 15, 2008.

(Continued)

*Primary Examiner* — Edward Look
*Assistant Examiner* — Jason Davis
(74) *Attorney, Agent, or Firm* — Westerman, Hattori, Daniels & Adrian, LLP

(57) ABSTRACT

A multistage high-pressure pump according to the present invention includes a rotational shaft (1), impellers (3) secured to the rotational shaft, a casing (2) configured to house the impellers therein, a mechanical seal (20), a seal chamber (25) that houses the mechanical seal therein, an oil reservoir (30) configured to store oil therein, an oil supply line (26) providing fluid communication between the oil reservoir (30) and the seal chamber (25), an oil pump (31) configured to pressurize the oil from the oil reservoir (30) and supply the oil to the seal chamber (25), a pressure retaining mechanism (32, 34, 35) configured to retain pressure of the oil in the seal chamber (25), and an oil outlet line (27) for discharging the oil from the seal chamber (25). The pressure of the oil in the seal chamber (25) is higher than pressure of the fluid.

9 Claims, 2 Drawing Sheets

(56) References Cited

U.S. PATENT DOCUMENTS

| | | |
|---|---|---|
| 5,865,441 A | 2/1999 | Orlowski |
| 6,070,880 A | 6/2000 | McKeever |
| 6,182,971 B1 * | 2/2001 | Parker et al. .................. 277/348 |
| 6,398,484 B1 * | 6/2002 | Orikasa et al. ................ 415/112 |
| 2007/0132188 A1 * | 6/2007 | Tahir et al. .................... 277/318 |

FOREIGN PATENT DOCUMENTS

| | | |
|---|---|---|
| JP | 63-166764 U | 10/1988 |
| JP | 5-106746 A | 4/1993 |
| JP | 2002-156092 A | 5/2002 |
| JP | 2003-144892 A | 5/2003 |

OTHER PUBLICATIONS

Extended European Search Report mailed Jun. 12, 2012, issued in corresponding European Patent Application 08703945.9.

\* cited by examiner

MULTISTAGE HIGH-PRESSURE PUMP

TECHNICAL FIELD

The present invention relates to a multistage high-pressure pump, and more particularly to a multistage high-pressure pump that handles a supercritical fluid, such as $CO_2$ and $H_2S$.

BACKGROUND ART

Petroleum exists as a liquid in an oil field covered with solid rocks. Natural gas exists as a gas in a gas field under the ground. In extracting petroleum, a boring machine is used to drill an extraction hole in the ground, so that petroleum is extracted through the extraction hole. In a new oil field, petroleum gushes itself by internal pressure of the oil field. On the other hand, in an old oil field, a pump is used to suck up petroleum. In this case, it is impossible to extract all petroleum in the oil field. Thus, high-pressure water or the like is supplied into the oil field, so that petroleum can be extracted from the oil field.

When extracting petroleum and natural gas, they are accompanied by $CO_2$ (carbon dioxide) or $H_2S$ (hydrogen sulfide). Because $CO_2$ can be the cause of global warming, emission of $CO_2$ should be as low as possible. However, it is conventional to release $CO_2$ into the atmosphere as it is without any processing. On the other hand, since $H_2S$ is a harmful gas, it has been customary to capture $H_2S$ by desulfurization equipment and bury the captured $H_2S$ in the ground.

In recent years, it has been a trend to recover $CO_2$ or $H_2S$, compress them by a compressor, and cool them to produce a liquid or supercritical fluid thereof. The liquid or supercritical fluid produced is further compressed by a high-pressure pump and injected under the rocks, so that $CO_2$ or $H_2S$ is returned to the ground. In order to fix $CO_2$ and $H_2S$ in a supercritical state stably in the ground (e.g., under the rocks), high pressure is required. A multistage high-pressure pump is most preferable as a pressure source in view of its volume and its shaft seal structure. This method enables stable extraction of petroleum and natural gas and can return $CO_2$ or $H_2S$ under the rocks. Therefore, not only can this method allow efficient use of $CO_2$ and $H_2S$, it can also be an environmentally-friendly method.

DISCLOSURE OF INVENTION

On the other hand, because the liquefied $H_2S$ is highly corrosive and toxic, the high-pressure pump is required to have a structure that can never permit leakage of the high-pressure supercritical fluid to the exterior of the pump. Therefore, it is an object of the present invention to provide a multistage high-pressure pump which does not permit leakage of a high-pressure fluid to the exterior of the pump.

In order to achieve the above object, according to one aspect of the present invention, there is provided a multistage high-pressure pump including: a rotational shaft; impellers secured to the rotational shaft; a casing configured to house the impellers therein; a mechanical seal; a seal chamber that houses the mechanical seal therein; an oil reservoir configured to store oil therein; an oil supply line providing fluid communication between the oil reservoir and the seal chamber; an oil pump configured to pressurize the oil from the oil reservoir and supply the oil to the seal chamber; a pressure retaining mechanism configured to retain pressure of the oil in the seal chamber; and an oil outlet line for discharging the oil from the seal chamber, wherein the pressure of the oil in the seal chamber is higher than pressure of the fluid.

In a preferred aspect of the present invention, the pressure retaining mechanism includes: a check valve provided on the oil supply line at a position between the oil pump and the seal chamber; at least one accumulator located between the check valve and the seal chamber; and a shut-off valve provided on the oil outlet line.

In a preferred aspect of the present invention, the mechanical seal includes:
a first rotary seal member and a first stationary seal member which are in sliding contact with each other; and a second rotary seal member and a second stationary seal member which are in sliding contact with each other.

According to the present invention, even if the oil pump is stopped in an emergency case, such as a power failure, the pressure of the oil in the seal chamber is maintained. Therefore, the fluid does not enter the seal chamber. As a result, the leakage of the fluid (e.g., a supercritical fluid) through a gap between a rotary side and a stationary side can be prevented.

BEST MODE FOR CARRYING OUT THE INVENTION

Figure 1:
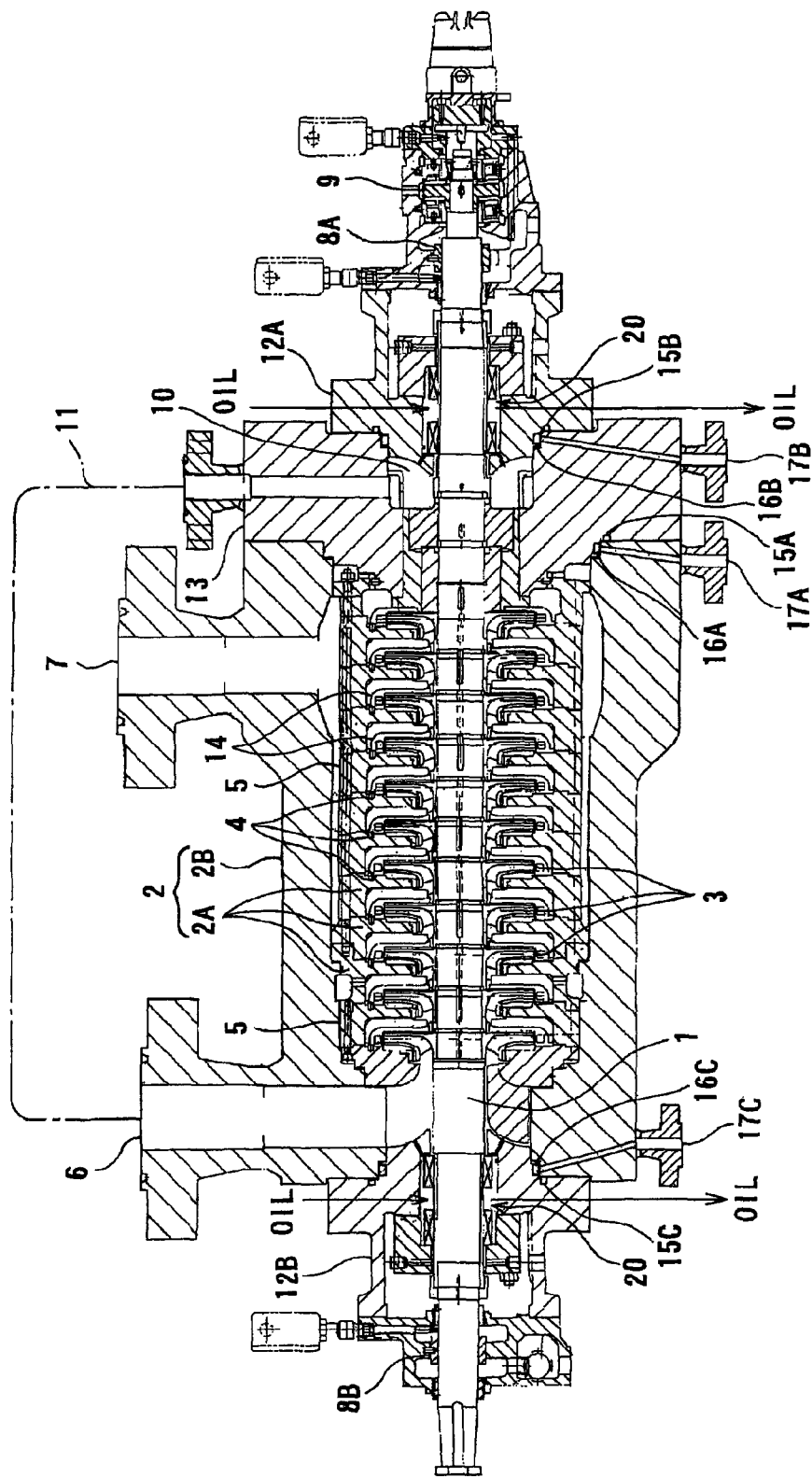
FIG. 1 is a cross-sectional view showing a pump according to an embodiment of the present invention.

An embodiment of the present invention will be described with reference to the drawings. FIG. 1 is a cross-sectional view showing a centrifugal multistage pump according to an embodiment of the present invention. This pump includes a rotational shaft 1 rotatably supported by radial bearings 8A and 8B and a thrust bearing 9, plural impellers 3 arranged in tandem on the rotational shaft 1, plural inner casings 2A configured to house the impellers 3 therein, and a barrel-shaped outer casing 2B configured to house the inner casings 2A therein. These inner casings 2A and the outer casing 2B constitute a casing 2 with a double-casing structure.

The multiple impellers 3 are arranged so as to face the same direction, and each impeller 3 is housed in each inner casing 2A one by one. A pin 4 is provided between each inner casing 2A and each guide vane 14, whereby a relative position between the inner casings 2A and the guide vanes 14 is fixed. Further, the inner casings 2A are fixed to each other by a plurality of through-bolts 5 extending along the rotational shaft 1. The outer casing 2B has an inlet 6 and an outlet 7. One end of the rotational shaft 1 is coupled to a driving device (e.g., a motor) which is not illustrated in the drawing, so that the impellers 3 are rotated by the driving device.

With the above-described configuration, as the impellers 3 rotate, a fluid (e.g., a supercritical fluid in this example) is sucked through the inlet 6 and pressurized successively by the respective impellers 3. A space between the inner casings 2A and the outer casing 2B is filled with the pressurized fluid, which is discharged through the outlet 7. Such double-casing structure has an advantage that the outer casing 2B is subjected to pressure of the fluid and tensile stresses while the inner casings 2A are subjected to only compressive stresses. In contrast, a single casing structure could be complicated in structure if it is designed to satisfy both "a shape suitable for compression of the fluid" and "a shape capable of withstanding high pressure". In this regard, the double-casing structure is advantageous because the inner casing and the outer casing can be designed and manufactured separately such that the inner casing has "a shape suitable for compression of the fluid" and the outer casing has "a shape capable of retaining pressure (i.e., a shape that can achieve an excellent sealing capability and can provide a safety with no leakage of the fluid to the exterior)". In this embodiment, components which contact liquid (e.g., the inner casings 2A, the outer casing 2B, and the impellers 3) are made of corrosion resistant material.

A casing cover 13 is secured to a discharge-side end of the casing 2. Further, a stuffing box 12A is secured to a side end of the casing cover 13. A stuffing box 12B is secured to a suction-side end of the casing 2. An O-ring 15A is provided between the casing 2 (the outer casing 2B in this example shown in FIG. 1) and the casing cover 13. Similarly, an O-ring 15B is provided between the casing cover 13 and the stuffing box 12A. Further, an O-ring 15C is provided between the casing 2 (the outer casing 2B in this example shown in FIG. 1) and the stuffing box 12B. An annular groove 16A is formed on a contact surface between the casing 2 and the casing cover 13, an annular groove 16B is formed on a contact surface between the casing cover 13 and the stuffing box 12A, and an annular groove 16C is formed on a contact surface between the casing 2 and the stuffing box 12B. These annular grooves 16A, 16B, and 16C are in fluid communication with pressure detection ports 17A, 17B, and 17C, respectively. These pressure detection ports 17A, 17B, and 17C are coupled to non-illustrated pressure sensors, respectively, and these pressure sensors are coupled to an alarm device. This alarm device is configured so as to raise an alarm when an output value of the pressure sensor is increased to reach a predetermined value.

In the above-described structures, if the fluid leaks out from the casing 2, the output value of the pressure sensor is increased. When the output value of the pressure sensor reaches the above-mentioned predetermined value, the alarm device raises the alarm, whereby the leakage of the fluid can be detected. Therefore, the above structures can provide a highly secure pump.

A balancing chamber 10 for balancing a thrust load generated by a pressure difference between a suction side and a discharge side is provided at the discharge side of the casing 2. More specifically, the balancing chamber 10 is formed in the casing cover 13. This balancing chamber 10 is shaped so as to surround the rotational shaft 1, and is in fluid communication with the inlet 6 through a communication line 11. Therefore, pressure in the balancing chamber 10 is equal to pressure (i.e., suction pressure) in the inlet 6. Generally, a specific gravity of a supercritical fluid varies according to pressure. There are several ways of balancing the thrust load applied in the axial direction. For example, impellers may be arranged so as to face in opposite directions, or a balancing piston may be provided while impellers are arranged so as to face in the same direction. In the pump for use in handling the supercritical fluid, the above-described structure (i.e., the balancing chamber 10 and the communication line 11) is most suitable.

As shown in FIG. 1, mechanical seals 20 are provided at the suction side and the discharge side of the casing 2. These mechanical seals 20 are located in the stuffing boxes 12A and 12B, respectively. Hereinafter, a shaft seal unit including the mechanical seal 20 will be described with reference to FIG. 2.

Figure 2:
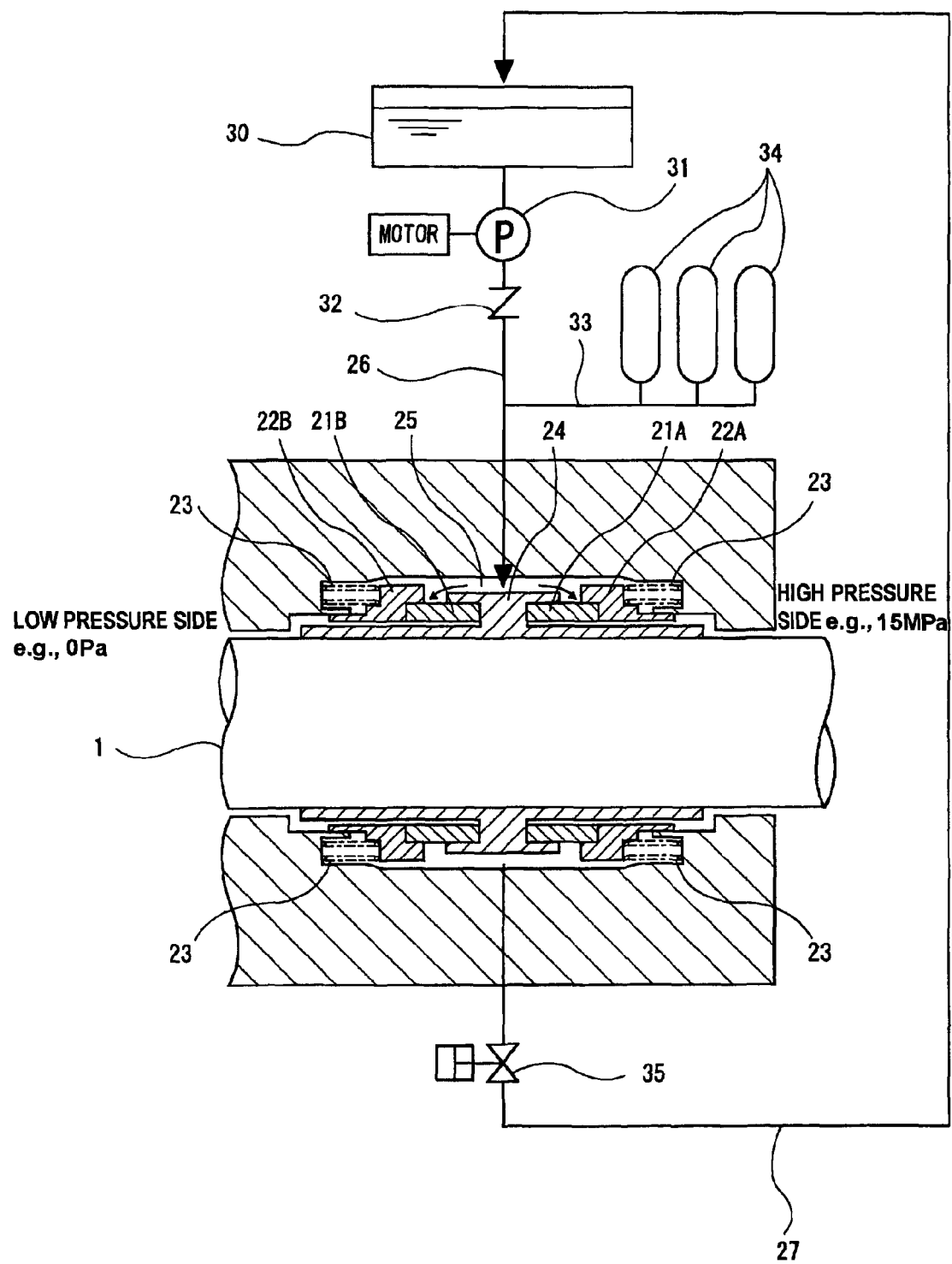
FIG. 2 is a view showing a shaft seal unit shown in FIG. 1.

FIG. 2 is an enlarged view showing the shaft seal unit including the mechanical seal 20 shown in FIG. 1. As shown in FIG. 2, the mechanical seal 20 is a double mechanical seal which is basically constituted by two pairs of rotary seal members and stationary seal members. More specifically, the mechanical seal 20 has two seal rings (first and second rotary seal members) 21A and 21B which are rotatable in unison with the rotational shaft 1, two seal ring bodies (first and second stationary seal members) 22A and 22B which are in sliding contact with the seal rings 21A and 21B, respectively, and springs (pressing mechanisms) 23 and 23 configured to press the seal ring bodies 22A and 22B against the seal rings 21A and 21B, respectively.

A sleeve 24 is secured to the rotational shaft 1, and the above-described seal rings 21A and 21B are secured to an outer circumferential surface of the sleeve 24. The above-described seal ring bodies 22A and 22B are secured to a stationary member. The two pairs of seal rings 21A and 21B and the seal ring bodies 22A and 22B are arranged symmetrically with respect to a plane that is perpendicular to the rotational shaft 1.

An oil supply line 26 is connected to the seal chamber 25, and one end of the oil supply line 26 is connected to an oil tank (i.e., an oil reservoir) 30. An oil pump 31 and a check valve 32 are provided on the oil supply line 26. The oil pump 31 is provided for pressurizing oil, supplied from the oil tank 30, to thereby deliver the pressurized oil to the seal chamber 25. The check valve 32 is located between the oil pump 31 and the seal chamber 25. A branch line 33 is connected to the oil supply line 26. Three accumulators 34 are coupled in parallel to the branch line 33. A connection point of the oil supply line 26 and the branch line 33 is located between the check valve 32 and the seal chamber 25.

Each accumulator 34 has a non-illustrated diaphragm (i.e., a partition wall) therein, and a gas, such as a nitrogen gas, is enclosed in the accumulator 34. Part of the oil to be delivered to the seal chamber 25 flows through the branch line 33, enters the three accumulators 34, and is accumulated in the accumulators 34. The oil, accumulated in the accumulators 34, is compressed by pressure of the above-described gas. Therefore, the accumulators 34 have the function of retaining pressure of the oil to be supplied to the seal chamber 25.

While three accumulators are provided in this embodiment, the present invention is not limited to these arrangements. For example, a single accumulator may be provided. Alternatively, two, or four or more accumulators may be provided. What is important is that the pressure of the oil retained by the accumulator(s) is higher than the pressure of the supercritical fluid pressurized by the rotation of the impellers 3 (see FIG. 1).

The check valve 32 allows the oil to flow only in a direction from the oil tank 30 toward the seal chamber 25. An oil outlet line 27 is further connected to the seal chamber 25. This oil outlet line 27 is in fluid communication with the oil tank 30. With this configuration, the oil is supplied from the oil tank 30 to the seal chamber 25 to fill the seal chamber 25, and is then returned to the oil tank 30 through the oil outlet line 27. In this manner, the oil circulates between the oil tank 30 and the seal chamber 25. An emergency shut-off valve 35 is provided on the oil outlet line 27. In case of emergency, such as a power failure, the emergency shut-off valve 35 is closed to stop the circulation of the oil.

The pressure of the oil to be supplied to the seal chamber 25 is set to be higher than the pressure of the fluid (e.g., the supercritical fluid in this embodiment) pressurized by the pump. For example, when the fluid is pressurized to about 15 MPa by the pump, the pressure of the oil in the seal chamber 25 is maintained at about 16 MPa. In this manner, because the pressure of the oil in the seal chamber 25 is higher than the pressure of the fluid, a slight amount of oil flows out to the exterior of the seal chamber 25 through gaps between the seal rings 21A and 21B and the seal ring bodies 22A and 22B. Therefore, the fluid, pressurized by the rotating impellers 3, does not enter the seal chamber 25, and is therefore prevented from leaking out to the exterior of the pump. The oil, that has passed through the gaps between the seal rings 21A and 21B and the seal ring bodies 22A and 22B, is expelled to the exterior of the pump through a non-illustrated drain.

When the oil pump 31 is stopped as a result of a power failure or other causes, the emergency shut-off valve 35 is closed to thereby stop the circulation of the oil. In this state, although the compression of the oil by the oil pump 31 is stopped, the pressure of the oil between the check valve 32 and the emergency shut-off valve 35 (i.e., the pressure of the oil in the seal chamber 25) is maintained by the accumulators 34. Therefore, even when the oil pump 31 is stopped, the pressurized supercritical fluid does not enter the seal chamber 25 and is thus prevented from leaking out to the exterior of the pump.

As described above, the pump according to the embodiment of the present invention is suitable for use as a high-pressure pump for handling the supercritical fluid, such as $CO_2$ and $H_2S$. The previous description of embodiment is provided to enable a person skilled in the art to make and use the present invention. Therefore, the present invention is not intended to be limited to the embodiments described herein and various modifications will be readily apparent to those skilled in the art, and the generic principles and specific examples defined herein may be applied to other embodiments.

INDUSTRIAL APPLICABILITY

The present invention is applicable to a multistage high-pressure pump that handles a supercritical fluid, such as $CO_2$ and $H_2S$.

The invention claimed is:

1. A multistage high-pressure pump for pressurizing a fluid, comprising:
    a rotational shaft;
    impellers secured to said rotational shaft;
    a casing configured to house said impellers therein;
    a mechanical seal constituted by a first pair of rotary seal member and stationary seal member in sliding contact with each other and a second pair of rotary seal member and stationary seal member in sliding contact with each other;
    a stuffing box secured to a side end of said casing and housing said mechanical seal therein;
    a seal chamber surrounded by a periphery of said rotational shaft, said stuffing box, and said first and second pairs of rotary seal members and stationary seal members;
    an oil reservoir configured to store oil therein;
    an oil supply line providing a communication between said oil reservoir and said seal chamber;
    an oil pump configured to pressurize the oil from said oil reservoir and supply the oil to said seal chamber, a gap being formed between said rotary seal member and said stationary seal member of each pair for discharging the oil from said chamber;
    a pressure retaining mechanism configured to retain pressure of the oil in said seal chamber such that the pressure of the oil in said seal chamber is higher than pressure of the fluid; and
    an oil outlet line for discharging the oil from said seal chamber, said oil outlet line being connected to said seal chamber at a site different from the gap.

2. The multistage high-pressure pump according to claim 1, wherein said pressure retaining mechanism includes:
    a check valve provided on said oil supply line at a position between said oil pump and said seal chamber;
    at least one accumulator located between said check valve and said seal chamber; and
    a shut-off valve provided on said oil outlet line.

3. The multistage high-pressure pump according to claim 1, wherein said mechanical seal is in contact with the fluid.

4. The multistage high-pressure pump according to claim 1, wherein said rotary seal members of said first and second pairs are rotatable in unison with said rotational shaft, and said stationary seal members of said first and second pairs are secured to a stationary member.

5. The multistage high-pressure pump according to claim 1, wherein said seal chamber is located in said stuffing box which is secured to a side end of said casing.

6. The multistage high-pressure pump according to claim 1, wherein said oil outlet line is coupled to said oil reservoir.

7. The multistage high-pressure pump according to claim 1, wherein the oil, that has passed through the gaps between said rotary seal members and said stationary seal members, is expelled to an exterior of said pump through a drain.

8. The multistage high-pressure pump according to claim 1, wherein said oil pump is configured to circulate the oil between said oil reservoir and said seal chamber.

9. The multistage high-pressure pump according to claim 2, wherein said shut-off valve is configured to be closed in case of a power failure.

* * * * *